United States Patent
Sheffield

(10) Patent No.: US 6,603,966 B1
(45) Date of Patent: Aug. 5, 2003

(54) METHOD AND SYSTEM FOR OPTIMIZING PERFORMANCE OF A MOBILE COMMUNICATION SYSTEM

(75) Inventor: John P. Sheffield, Frisco, TX (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 08/996,486

(22) Filed: Dec. 23, 1997

(51) Int. Cl.⁷ .................. H04B 17/00; H04Q 7/20
(52) U.S. Cl. ............. 455/423; 455/67.1; 455/67.4; 455/424; 370/241
(58) Field of Search .................. 455/423, 456, 455/446, 449, 67.1, 67.4, 67.7, 466, 424, 425, 560, 561; 379/1.01, 24, 26.01, 27.02; 370/241–252

(56) References Cited

U.S. PATENT DOCUMENTS

| | | | | |
|---|---|---|---|---|
| 5,027,343 A | * | 6/1991 | Chan et al. ............ | 455/67.1 |
| 5,070,536 A | * | 12/1991 | Mahany et al. ........ | 455/67.1 |
| 5,257,407 A | * | 10/1993 | Heinzelman ........... | 455/67.1 |
| 5,307,510 A | * | 4/1994 | Gunmar et al. ........ | 455/67.1 |
| H1641 H | * | 4/1997 | Sharman ............... | 379/60 |
| 5,768,689 A | * | 6/1998 | Borg ..................... | 455/67.4 |
| 5,774,695 A | * | 6/1998 | Autrey et al. .......... | 395/500 |
| 5,799,154 A | * | 8/1998 | Kuriyan ................ | 455/67.1 |
| 5,802,105 A | * | 9/1998 | Tiedemann, Jr. et al. | 375/225 |
| 5,802,473 A | * | 9/1998 | Rutledge et al. ....... | 455/441 |
| 5,878,328 A | * | 3/1999 | Chawla et al. ......... | 455/67.1 |
| 5,884,163 A | * | 3/1999 | Hardouin .............. | 455/423 |
| 5,913,162 A | * | 6/1999 | Gourdin et al. ........ | 455/424 |
| 5,924,029 A | * | 7/1999 | Sohngen et al. ....... | 455/423 |
| 5,926,762 A | * | 7/1999 | Arpee et al. ........... | 455/447 |
| 6,035,183 A | * | 3/2000 | Todd et al. ............ | 455/226.2 |
| 6,052,593 A | * | 4/2000 | Guimont et al. ....... | 455/446 |
| 6,148,194 A | * | 11/2000 | Kao et al. .............. | 455/421 |

* cited by examiner

*Primary Examiner*—Duc Nguyen
(74) *Attorney, Agent, or Firm*—Klarquist Sparkman, LLP

(57) ABSTRACT

Call data collected from the switch at a Mobile Telephone Switching Office is combined with location information of a mobile unit to generate information reports concerning the electromagnetic coverage of a geographic region. The collection of call data from the switch permits consideration of uplink information in the analysis of system performance. The uplink information reflects performance of specific equipment that is in use by the wireless customer. This uplink information may be combined with downlink and location information to remove from the performance evaluation transient effects associated with, for example, local terrain and other physical impairments.

5 Claims, 16 Drawing Sheets

5

44

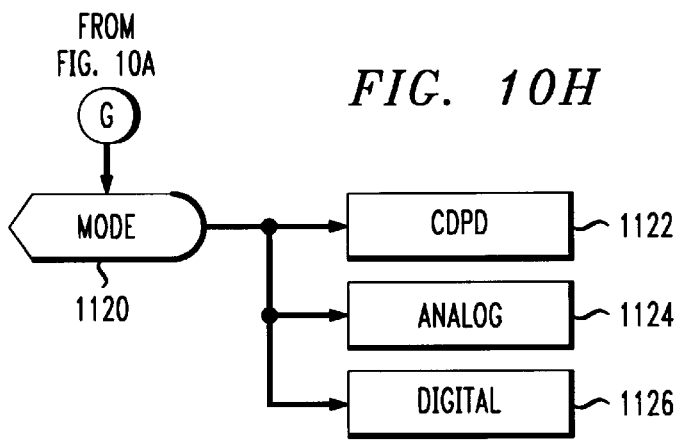
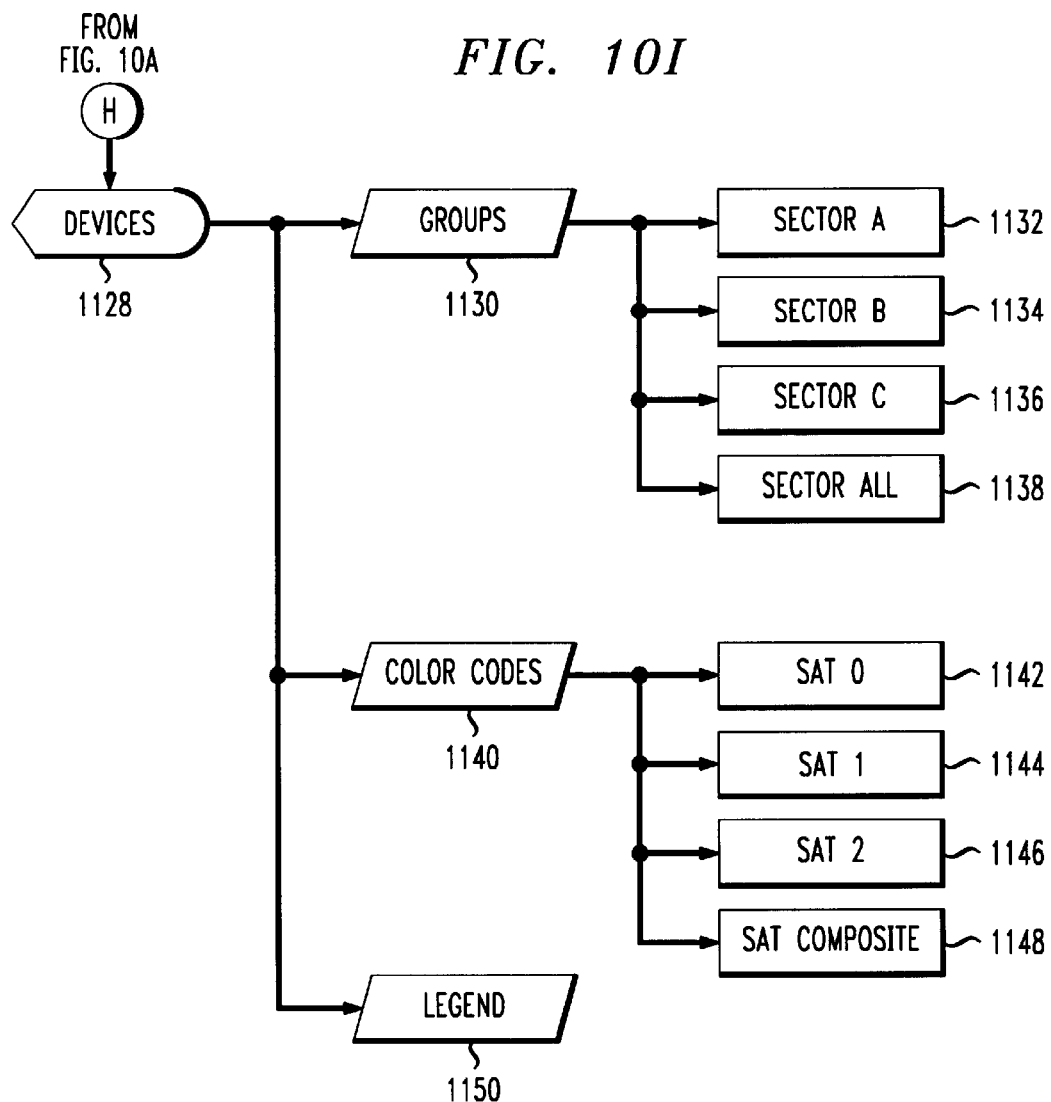

METHOD AND SYSTEM FOR OPTIMIZING PERFORMANCE OF A MOBILE COMMUNICATION SYSTEM

BACKGROUND OF THE INVENTION

1. Field of the Invention

The present invention relates to mobile communications systems and, more specifically, to a method and system for optimizing performance of a mobile communications system.

2. Background of the Invention

FIG. 1 shows a block diagram of a conventional cellular radiotelephone communication system 5 which includes cells 6, radio base stations or cell sites 8, and a Mobile Telephone Switching Office (MTSO) or mobile telephone switching center 9. As a mobile telephone customer 7 moves from one cell to another a switch in the MTSO automatically switches connections with the respective radio base stations to maintain a continuous connection with the public switched network (not shown). Typically, a switch in an MTSO 9 is connected to approximately one hundred cell sites.

A problem associated with the management of a cellular radiotelephone communications system is geographically locating an area within the zone of radio coverage or cell where faulty coverage exists. An example would be an area within a cellular telephone system that provides poor service due to moderate levels of interference. Typically, this situation is uncovered in one of two ways; customer complaints or the persistent drive team testing by system operators. Neither of these approaches, however, provides a very timely or comprehensive means of identifying, diagnosing, and curing faulty coverage.

In response to these deficiencies, the cellular industry has turned to the aid of electromagnetic coverage prediction tools to assist in the search for holes in the coverage. Typically, these methods of monitoring system performance include observing downlink information along with other system parameters. (Downlink being defined as signals travelling from the cell site to the mobile unit and uplink being defined as signals travelling from the mobile unit to the cell site). The assumption has been that if the downlink was closed (i.e., a good connection was attained), the available uplink power would be sufficient to close the uplink.

One such electromagnetic coverage tool which takes into account uplink information is discussed by Kurt Nikkinen in "Switch Reality", AT&T Wireless Service, Apr. 15–16, 1997, and hereby incorporated by reference. This electromagnetic coverage tool involves transmitting location information of a mobile unit to a base station using a cellular modem and also gathering call information from a switch location. The location and call information is then collected at the base station and entered into a map plot.

SUMMARY OF THE INVENTION

The present invention is briefly described as a method and system of monitoring the performance of a wireless telecommunications system. In preferred embodiments there is disclosed a method and system of evaluating the coverage of a geographic area serviced by a mobile communications system.

In one aspect, the method includes obtaining uplink performance parameters related to at least one mobile unit from the mobile switching center, obtaining location information related to the location of the mobile unit, and analyzing the performance of the telecommunications system based on the uplink and downlink performance parameters and the location information to obtain analysis results.

In one aspect, the system includes monitoring performance of a wireless telecommunications system, the system including: a mobile unit forming a wireless connection to a radio base station; the radio base station connected to a switch; a base system analyzer coupled to said switch and which performs analysis of call data collected at the switch; a mobile PC transmitting location over a packet network to the base system analyzer; and wherein the system analyzer evaluates the performance of the telecommunications system based on uplink performance parameters and the location of the mobile unit.

In one aspect, the system includes monitoring performance of a wireless telecommunications system, the system including: a mobile unit forming a wireless connection to a switch; a means for collecting and transmitting uplink performance parameters of the wireless connection at the switch to a system analyzer; a means for sending the location of the mobile unit to the system analyzer; and wherein the system analyzer evaluates the performance of the telecommunications system based on the uplink performance parameters and the location of the mobile unit.

BRIEF DESCRIPTION OF THE DRAWINGS

FIGS. 10A–10L Illustrate how the Mapview program operates.

DETAILED DESCRIPTION OF PREFERRED EMBODIMENT

In the preferred embodiment, call data collected from the switch at the Mobile Telephone Switching office (MTSO) or mobile switching center is combined with location information of a mobile unit to generate information reports concerning the signal coverage of a geographic region. The collection of call data from the switch at the switching center permits consideration of uplink and also downlink information in the analysis of system performance. The uplink information reflects performance of specific equipment that is currently in use by the wireless customer. This uplink information may be combined with location information to remove from the performance evaluation transient effects associated with, for example, local terrain and other physical impairments. The preferred embodiment also allows real-time analysis to be performed by transmitting data over a packet network such as a cellular digital packet data (CDPD) network.

Figure 1:
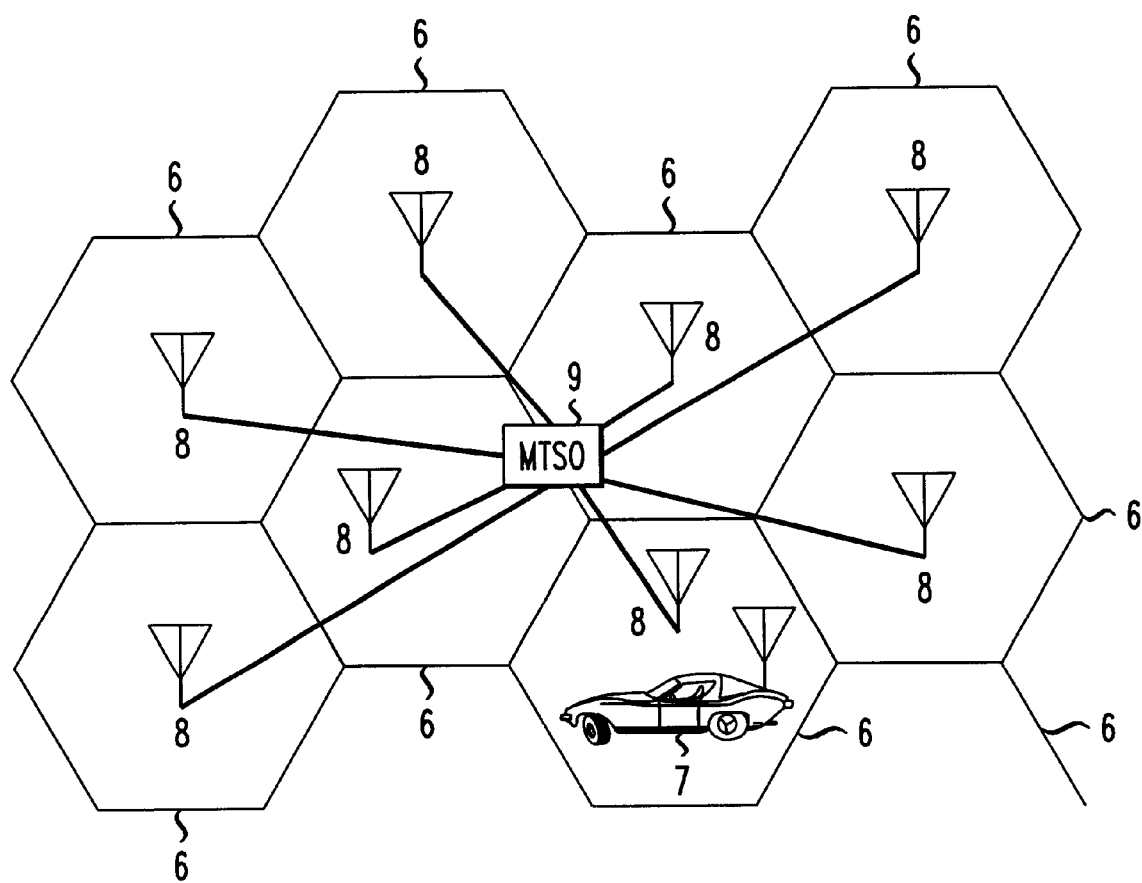
FIG. 1 is a block diagram of a conventional cellular radiotelephone system.
Figure 2:
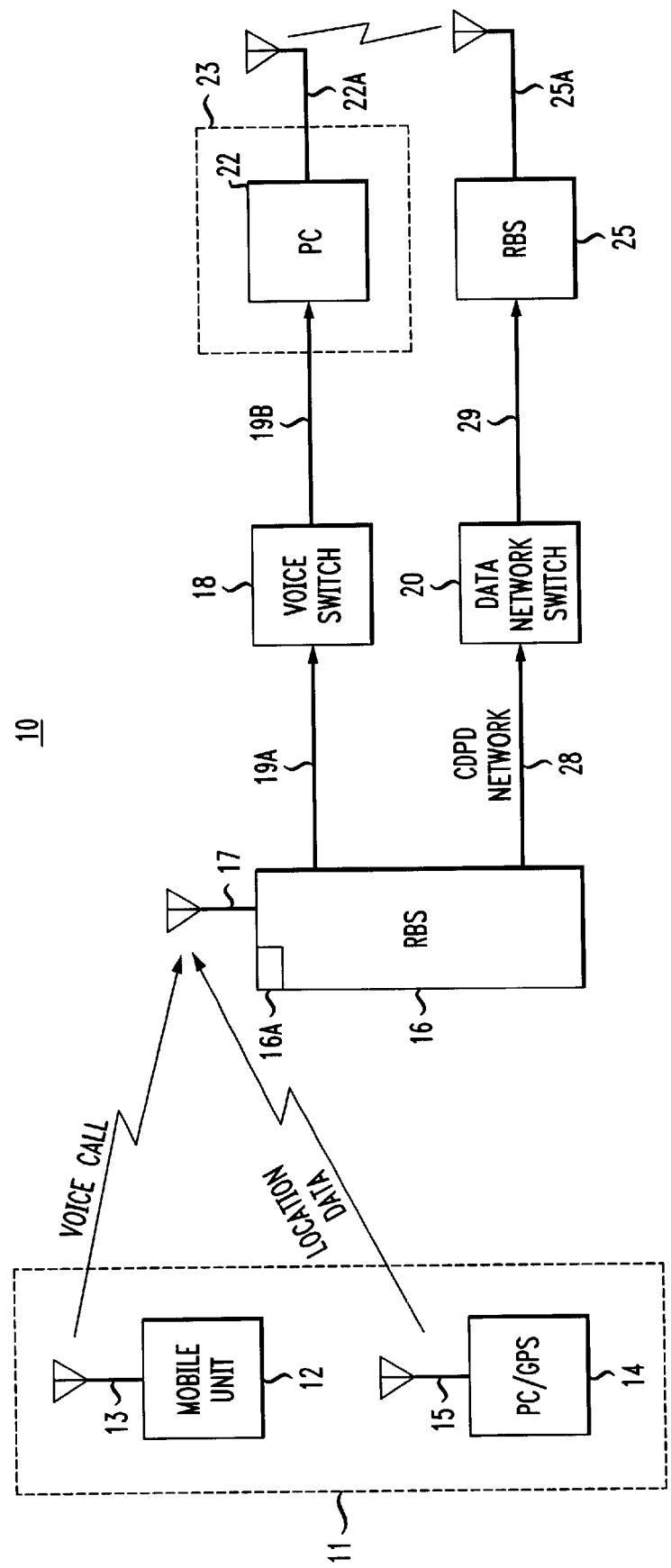
FIG. 2 is a block diagram of a system for optimizing a mobile communication system according to a preferred embodiment of the present invention in which location data of a mobile unit is sent over a packet network such as a cellular digital packet data (CDPD) network.

FIG. 2 is a diagram of a communication system 10 employing a preferred embodiment of the present invention. Since it is understood by those skilled in the art that other components and devices are typically included in this environment, only those pertinent to the preferred embodiment will be discussed.

Mobile vehicle 11 contains a mobile unit or station 12 and a mobile Personal Computer with a Global Positioning System (PC/GPs) 14. The GPS allows the location of the mobile unit to be monitored with high accuracy. The GPS used in the PC/GPS 14 may be a TRIMBLE PCMCIA GPS receiver. The mobile unit 12 may include cellular telephones, personal codification system (PCS) handsets, or some other type of mobile communication device not limited to telephones such as personal computers, paging devices, etc. In this discussion, cellular is being used to indicate any type of mobile communication system—analog or digital—which divides a region into geographic areas (cells) and involves handing off of the mobile unit as it moves from cell to cell. PCS is a type of cellular mobile communication system which is digitally based and therefore can offer a broader range of services than an analog based system. Although any type of mobile communication device may be used as the mobile unit 12, the use of a digital device would provide the most information.

As the mobile unit 12 moves through the cellular system it operates off of cell sites connected to local voice switches. The mobile unit 12 transmits voice calls to a receiver 17 at a radio base station (RBS) 16 through a transmitter 13. (Alternative embodiments may have a greater number of transmitters and receivers). The call is then routed through a standard link 19A to a local voice data network switch 18 connected to the RBS 16. The call data is collected at the voice switch 18 and forwarded over a standard link 19B such as a Local Area Network (LAN) or voice line to the base unit 23. (Note that in an alternative embodiment link 193 may be a CDPD network). The base unit 23 contains a base PC 22 and a CDPD modem 22A. The PC 22 functions as a system analyzer for analyzing the incoming data.

In the preferred embodiment, the call data is collected on the uplink at the switch 18 using Cell Traffic Recording (CER) software. CER is a software function provided to users of an Ericsson mobile telephone switch. CER describes everything about the call in text format. This function allows real-time tracing of the activities of a phone call in progress. Although the preferred embodiment is directed to an Ericsson switch the invention may just as well involve other switches using software other than CER to collect call data. The call data is routed from the switch 18 in serial text format to the PC 22 at the base unit 23.

The call data collected from the switch 18 may include many different types of mobile communication system parameters. Examples include, but are not limited to, the following: Forward and Reverse (or Received) Signal Strength Indication (SSI); Forward and Reverse Bit Error Rate (BER); Time Alignment; Frequency error: Power Level of Mobile (PLM) unit; Frequency Group; Channel; Voice Channel Group; Mobile Device Identification Number; Mobile Manufacturer Information; and Mobile Assisted Handoff (MAHO) information which may include data on neighboring cell sites as well.

Therefore, the preferred embodiment allows a system evaluator located at the base PC 22 to take advantage of information from the switch to analyze the service provided by the cell. The preferred embodiment allows two types of analysis to be performed. The first one is a real-time analysis which occurs while the mobile unit 12 is traversing the drive route. The real-time nature of the analysis allows the system evaluator located at the base PC 22 to be in communication with the driver located in the mobile vehicle 11 and to receive constant reports from the driver on obstacles which might be the cause of problems in the service (i.e., tall buildings, mountains, etc.). The second type of analysis is post-processing analysis which occurs after the driver has completed traversing the route. The second type of analysis is more in-depth and allows the call data and location data to be recorded and then analyzed in many different ways to optimize the service level of the cell site.

Collecting call data at the switch allows, for example, analysis of information such as the mobile assisted handoff (MAHO) received signal strength indicator (RSSI) of the neighboring cells reported back to the voice switch 18 by the mobile unit 12. MAHO is the method that enables the hand-off from cell site to cell site to be triggered using the downlink signal strengths of a measurement channel. Therefore, the voice switch 18 maintains which cell is carrying the call and it also has a list of neighboring cell sites that are to be considered as handoff candidates. The neighbor list includes the measurement channel, usually the digital control channel (DCCH), associated with a neighboring cell. The voice switch 18 sends a list of measurement channels to the mobile unit 12 to be scanned. The measurement channel is continuously transmitting a downlink signal that the mobile unit 12 records the RSSI level of and every second reports back the RSSI levels of the neighboring cells from the list to the voice switch 18. When a neighboring cell becomes the better server, a hand-off will take place. The switch 18 at the MTSO determines when to hand the mobile customer off. By recording these MAHO RSSI values the preferred embodiment is able to provide a very complete picture of the coverage area of the serving cell as well as all of its neighboring sites in the system analysis step which will be discussed below. This way more detailed coverage plots may be obtained with only one drive test.

The call data from the switch 18 contains almost all of the important information about the parameters of a call but cannot provide the current location of the mobile customer to determine where a problem in coverage is occurring. So the information is irrelevant if the location of the mobile unit 12 cannot be found.

Messages concerning the current location (i.e, latitude and longitude) of the mobile vehicle 11 with the mobile unit 12 are sent from PC/GPS 14 through a transmitter 15 and are received at cellular digital packet data (CDPD) network equipment 16A located at RBS 16 as shown in FIG. 2. CDPD is a technology that folds data into packets that are sent at very high speeds during pauses in cellular phone conversations. By adding CDPD technology to an existing cellular system, the location data may be sent without congesting voice channels with data.

The location data is sent from the RBS 16 over a CDPD network 28 to a data network switch 20. The data network switch 20 then connects to another RBS 25 through a link 29. The RBS 25 sends the information from antenna 25A to the CDPD modem 22A of the base station 23. At PC 22 in the base station 23, the location information and the call data are combined and analyzed to evaluate the system performance. The use of the CDPD network 28 allows the location information to be sent to the base PC 22 even if the voice network has failed and thereby improving the real-time nature of the analysis.

Another aspect of the preferred embodiment is that the location data may also be stored locally on the mobile PC/GPS 14 with a time stamp synchronized with the central location PC 22 in case the CDPD network is down. Therefore, although the real-time nature of the analysis is lost, the test drive of the vehicle 11 may be recorded and evaluated in a post-processing time period.

Another aspect of the preferred embodiment is that by allowing the PC/GPS 14 to deliver the location data over the CDPD network it allows the testing of the CDPD network at the same time. If the system evaluator does not see the vehicle's 11 position on the central location or base PC 22 then the CDPD network is not working in that area and a CDPD technician may be dispatched to investigate.

Another aspect of the preferred embodiment is that the central location 23 may be located right at the switch 18 or at any other location to obtain even greater efficiency.

The system analysis of the preferred embodiment is conducted at the base PC 23. As previously discussed, the preferred embodiment allows for real-time analysis as well as post-processing analysis to occur. The preferred embodiment involves merging the call data information from the uplink at the switch 18 with the location of the mobile vehicle 11 and downlink information to produce and display a map to diagnose how the system is performing as the mobile vehicle 11 drives around. This information is used to fine tune the cellular network. By using the call data information from the switch 18 it allows a system evaluator to examine both the quality of the uplink and the downlink and correct any problems found. For example, by analyzing the data it may be found that the mobile unit 12 may not be powering up enough and it should be powered up more.

Figure 3:
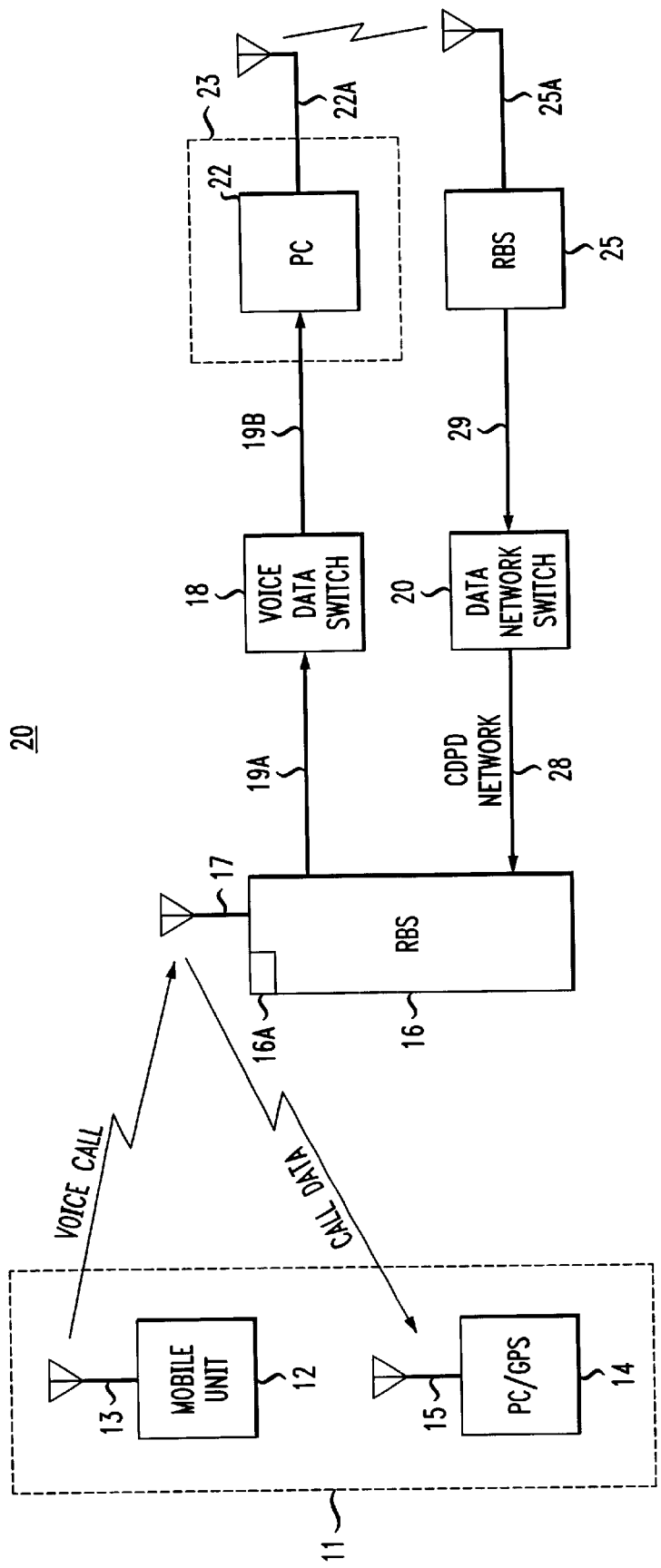
FIG. 3 is a block diagram of a system for optimizing a mobile communication system according to an alternative embodiment of the present invention In which the location data in maintained at the mobile unit and call data is sent over a packet network (e.g., CDPD network) from the switch to a mobile PC with GPS which is acting as the base station.

In an alternative embodiment shown in FIG. 3, a communication system 20 is shown in which call data is collected at the switch 18 and sent over the CDPD network 28 back to the mobile vehicle 11 and merged with the GPS location data on the mobile PC/GPS 14. The real-time analysis could then be done at the mobile vehicle 11 instead of on the base PC 22 at the central location 23. The mobile unit 12 may be used because the mobile unit does not have to be connected to the PC/GPS 14. This alternative embodiment would allow the system evaluator conducting the drive test to monitor the call data while seeing for himself the surrounding topography. The system evaluator may then remove from the performance evaluation transient effects associated with, for example, local terrain and other physical impairments.

Figure 4:
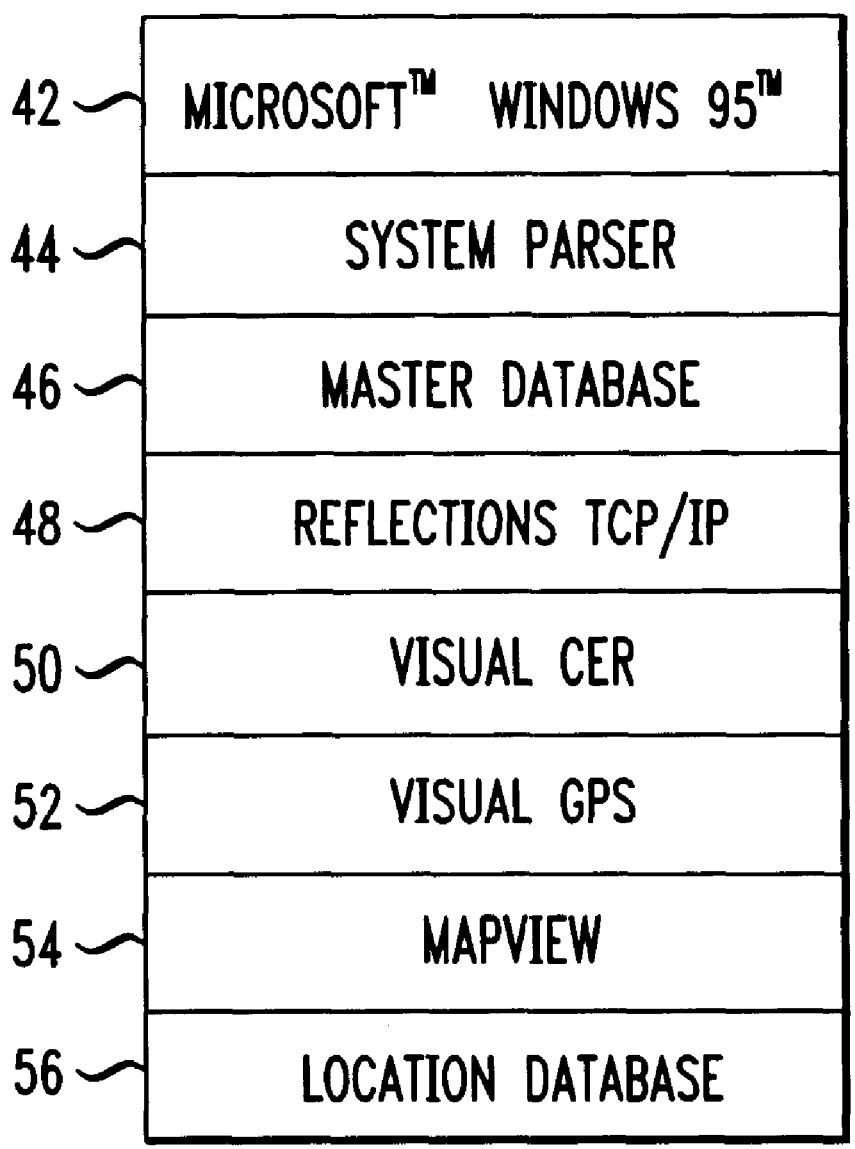
FIG. 4 illustrates a suite of software programs that will be used in the method and system of the preferred embodiment.

In the preferred embodiment, the system analysis is primarily accomplished through a suite of optimization software programs 40 as disclosed in FIG. 4. The optimization software programs 40 provide a way to efficiently optimize telephone systems in both real-time while identifying service interruptions and also in a post-processing time period for more in-depth analysis. The optimization system software 40 as shown in FIG. 4 includes MICROSOFT WINDOWS 95™ 42, a system parser 44, a master database 46, REFLECTIONS TCP/IP (transmission control protocol/ Internet protocol) 48, Visual CER 50, visual GPS 52, Mapview software 54, and a location database 56. The optimization system software 40 may be loaded on the base PC 22 and the PC/GPS 14. Note that the optimization system software 30 is not limited to these software programs and may include more software programs and/or different types depending on the type of coverage analysis required.

Windows 95™ 42 is a well-known Microsoft™ product which may be used as the operating system.

The system parser 44 is a software program that utilizes data which is collected from the switch 18 and from other sources to update the master system database 46. The system parser 44 may be used to convert text files in ASCII form collected from the switch 18 into tables. These tables are then joined into relations to provide queries to be visualized later in the optimization process.

The master database 46 may be implemented Using Microsoft™ Access™ in the preferred embodiment. The master database 46 is utilized as the central point for all system information. The master database 46 is made up of mapable tables which are being constantly updated by the system parser program 44. These mapable tables are used by the Visual CER 50, Visual GPS 52, and Mapview 54 programs to geographically display the switch and cell information. The multiple tables in the master database 46 reflect the actual switch 18 parameter settings and other data about the cellular network. Visual CER 50 and Mapview 54 use the master database 46 so that what is seen on their maps is what is really in the switch 18. This allows the system evaluator to find problems and therefore quickly improving the performance of the network and thus reduce the number of customer complaints.

One of the most overlooked aspects of maintaining a cellular telephone network is the maintenance of the system databases. Most are static databases containing information about site locations, antennas, transmission lines, tower heights, FAA information, etc. The databases that contain information about the parameters that control how the mobile acts while in the network are more variable. When these parameters are changed in the switch 18 and are not updated in the system parameter waster database 46, the system operators may be making decisions with incorrect data resulting in lost time and poor results. Therefore, an advantage of the preferred embodiment is that the software programs used in the system analysis allow the system evaluator to rely on constantly updated information from the switch 18.

Figure 5:
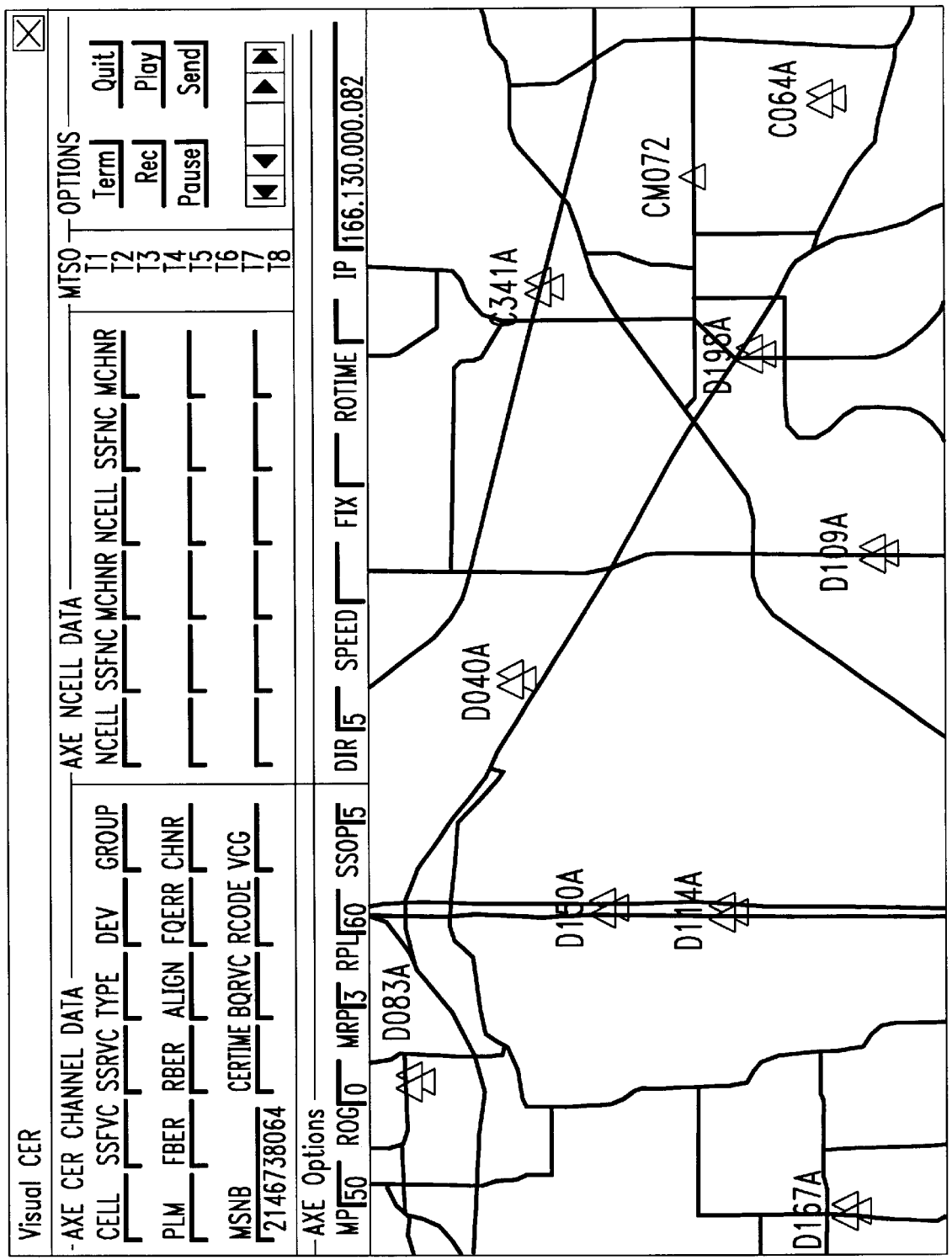
FIG. 5 illustrates a visual CER display on a base PC.
Figure 6:
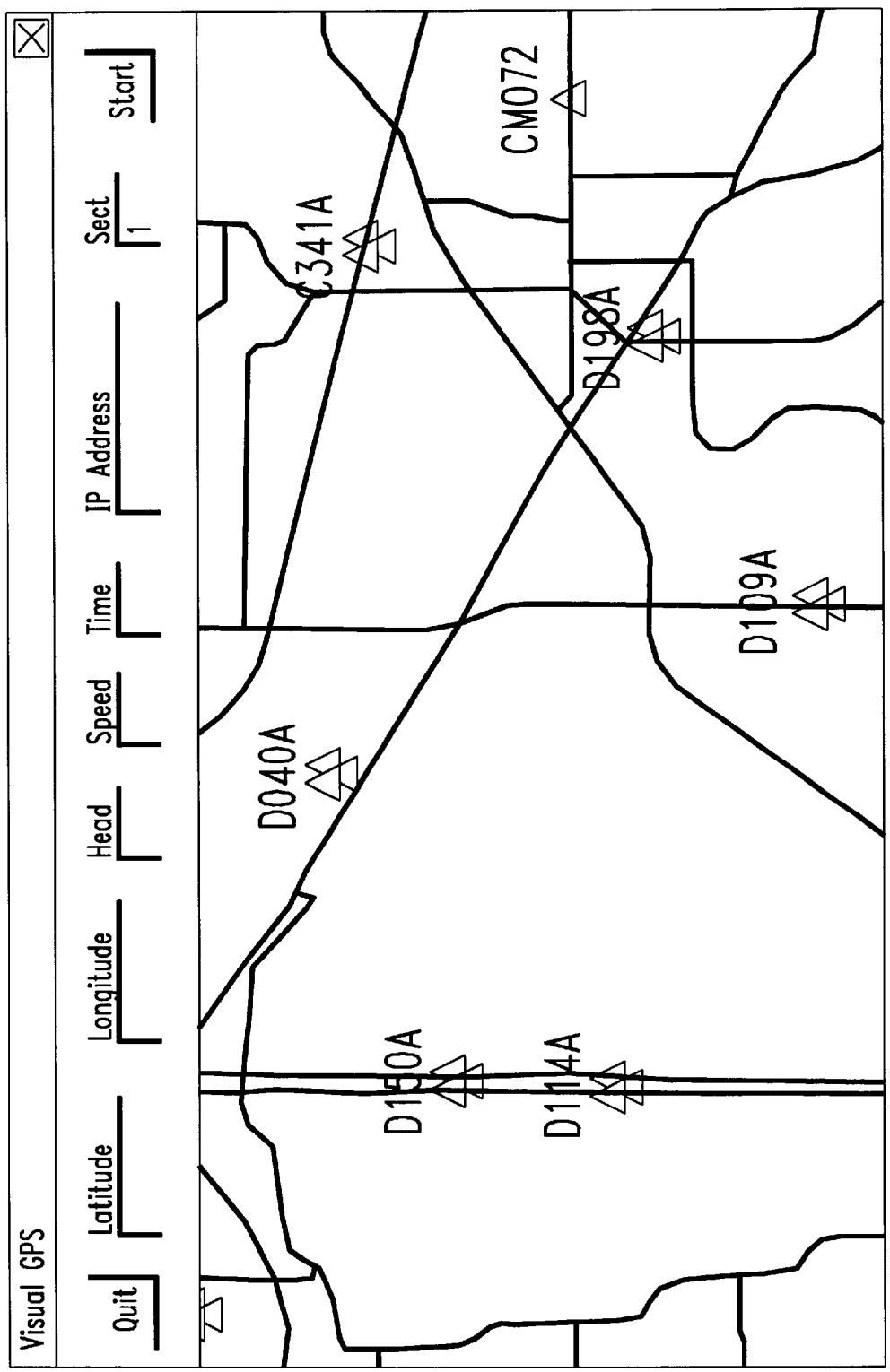
FIG. 6 illustrates a Visual GPS display on a mobile PC with GPS.

Two software programs which may be used for data collection and real-time vehicle position tracking at both PC/GPS 14 and PC 22 include Visual CER 50 and Visual GPS 52. A typical PC screen display of Visual CER 50 is shown in FIG. 5 and a typical PC screen display of Visual GPS 52 is shown in FIG. 6. Both Visual CER 50 and Visual GPS 52 in a preferred implementation are software programs written using Microsoft's Visual Basic™. Visual CER 50 in the preferred embodiment is loaded into the base PC 22 to allow for real-time observation of the call data combined with the location information of the mobile vehicle 11. Visual GPS 52 is loaded into the PC/GPS 14 and allows the operator of the vehicle 11 to observe the location of the vehicle 11 on the PC/GPS 14. As previously discussed, the Visual GPS program 52 will transmit the location data to the base PC 22 through the CDPD network 28. The PC/GPS 14 may also record the location data along with a base/remote synchronized PC time stamp to the location database 56 for later use. As discussed above, a base/remote synchronized PC time stamp is sent from base PC 22 to PC/GPS 14 so that the recording of data in both locations is synchronized for post-processing system evaluation. The Visual CER program 50 will merge the call data from the switch 18 with the location data received from the mobile unit 12. This composite information is then logged and displayed in real-time for the System evaluator at the base PC 22.

Figure 8:
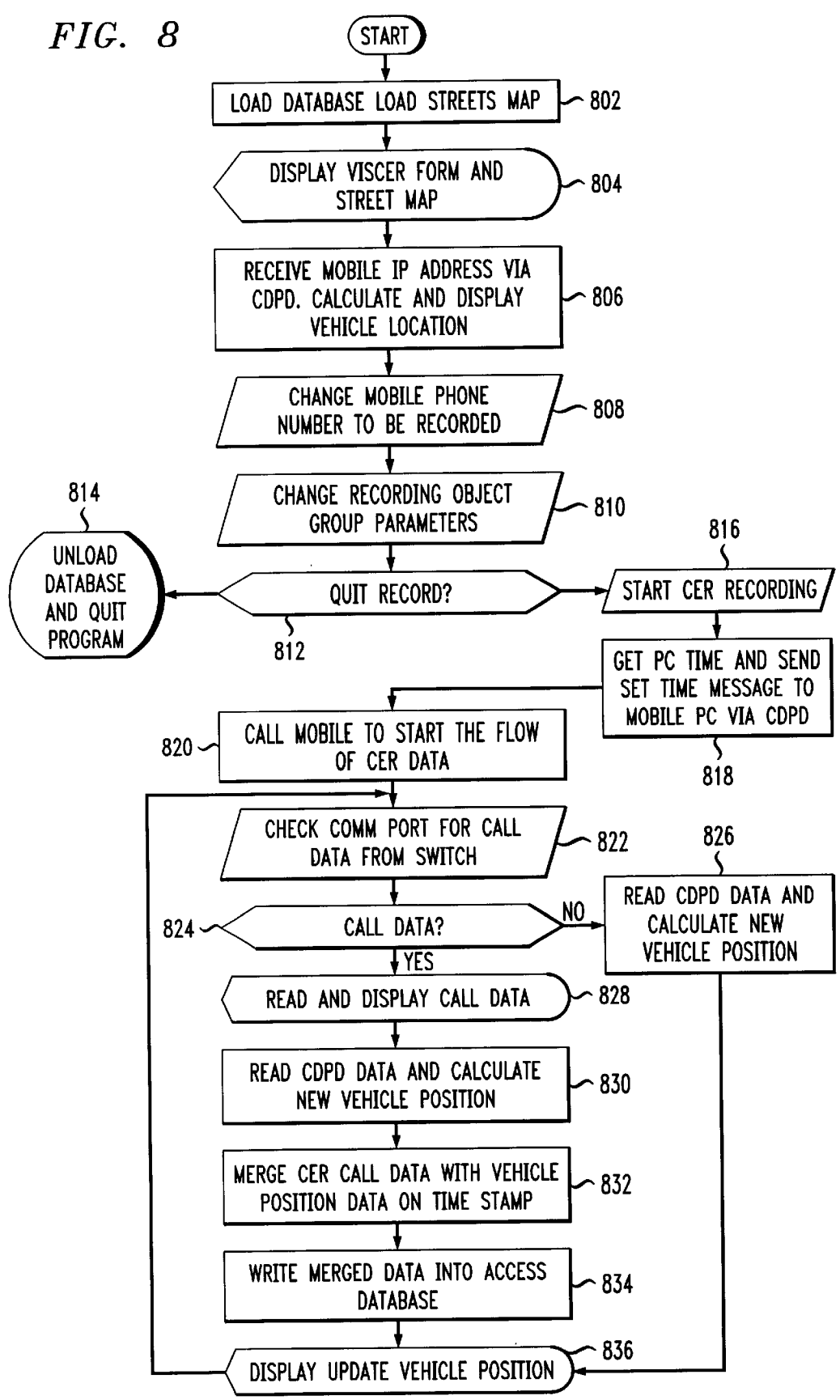
FIG. 8 illustrates a flowchart demonstrating how the Visual CER program operates.

FIG. 8 illustrates the operation of the Visual CER program 50. In step 802, the database and streets map are loaded in the base PC 22. In step 804, a Visual CER form and a street map are displayed. In step 806, the mobile phone Internet Protocol (IP) address is received via the CDPD network and the vehicle location is calculated and displayed. In optional step 808, the mobile phone number to be recorded may be changed. In optional step 810, the recording object group parameters may be changed. The recording object group parameters are the parameters that dictate the length of the CER recording and a list of mobile phone numbers that the system evaluator wants to record. In step 812, a choice is made whether to quit or record the drive. It the decision is made to quit, then in step 814, the database of the PC 22 is unloaded. If the decision is made to record the drive, then step 816.

In step 818, the PC time stamp is sent from the base PC 22 to the PC/GPS 14 via the CDPD network. In step 820, the mobile unit 12 is called to start the flow of call (or CER) data at the switch 18. In step 822, the communication port on the base PC 22 is checked for call data from the switch 18. In step 824, it is determined if data has arrived. If no data has arrived, then the CDPD data is read and a new position of the vehicle 11 is calculated in step 826. The updated position is then displayed on the base PC 22 in step 836 and then a loop back occurs to step 822 to check the confiscation port again.

If call data has arrived in step 824, then the decision is made to go to step 828 and read and display call data on the base PC 22. In step 830, the CDPD data is read and the new vehicle position is calculated. In step 832, CER call data is merged with vehicle position data. (The merger is synchronized based on the time stamp which was sent to the PC/GPS 14 in step 818). In step 834, the merged data is written into the master database 46. In step 836, the updated vehicle position is displayed and then the decision is made to go to step 822 to check the communication port again for more data.

Figure 9:
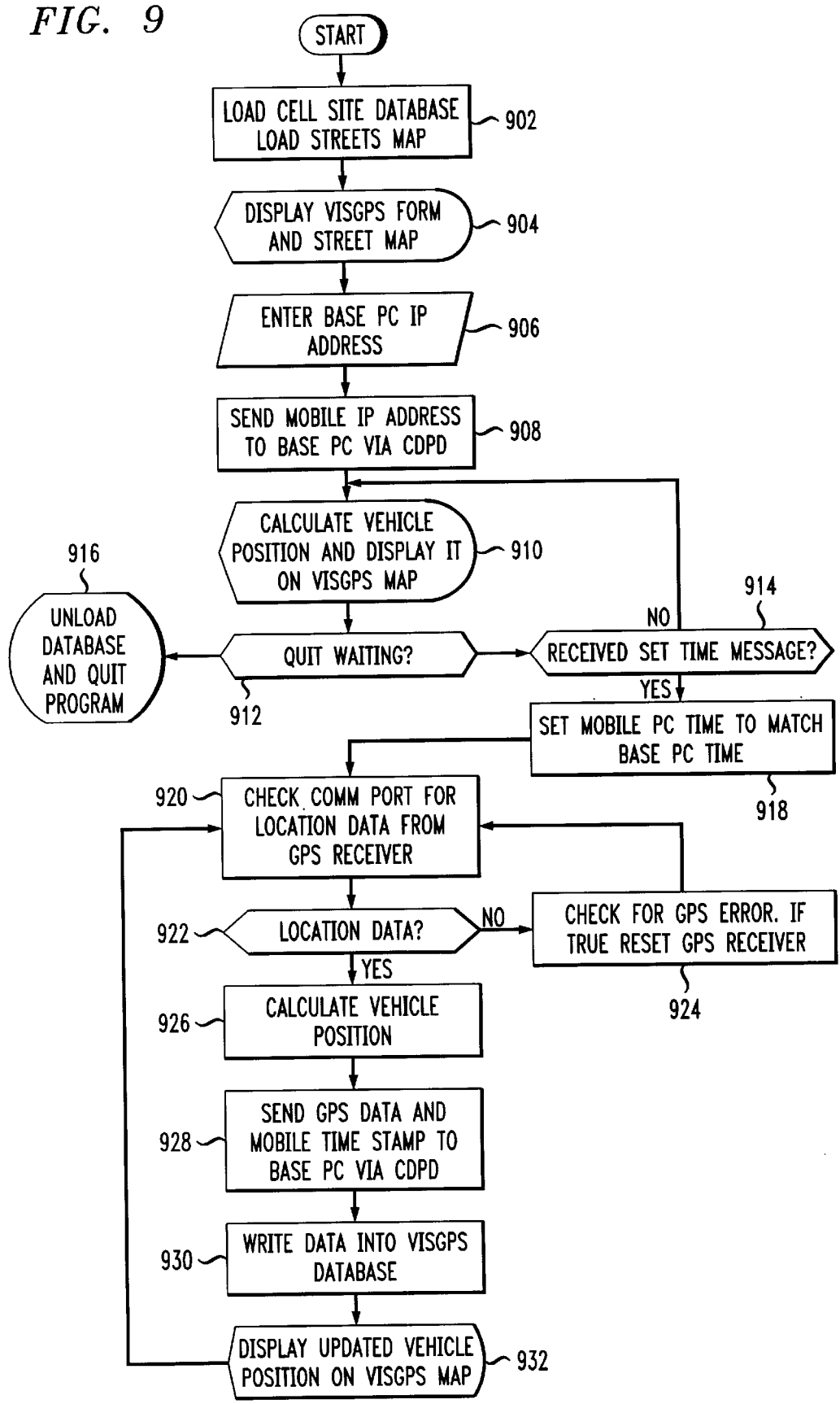
FIG. 9 illustrates a flowchart demonstrating how the Visual GPS program operates.

Referring to FIG. 9, the Visual GPS program 52 is loaded into PC/GPS 14. In step 902, the cell site database and streets map is loaded. In step 904, a Visual GPS form and street map are loaded. In step 906, the base PC 22 IP address is loaded. In step 908, mobile PC/GPS 14 IP address is sent to base PC 22 via CDPD network. In step 910, the vehicle position is calculated and displayed on a Visual GPS map. In step 912, the decision is made to quit (and unload the database in step 916) or wait for a received time stamp message from the base PC 22. In step 914, if the set time message has not arrived the Visual GPS program will loop back to step 910. If the time stamp message has arrived, the Visual GPS program will proceed to step 918 to synchronize the mobile PC/GPS 14 time with the base PC 22 time, In step 920, the communication port on the PC/GPS 14 will be checked for location data from the GPS receiver. In step 922, if location data has not arrived, then the decision is made to go to step 924 and check for GPS error. It there is an error, the GPS receiver is reset and the decision is made to go to step 920 and if there is no error the decision is made to go to step 920. If location data is received in step 922, then calculate vehicle position in step 926. Send GPS data and mobile time stamp to base PC via CDPD network in step 928. In step 930, write data into Visual GPS location database 56. In step 932, display updated vehicle position on Visual GPS map and then return to step 920.

The Mapview software 54 ("Mapview") will be used in the preferred embodiment for in-depth, post-processing evaluation of the call data and location data obtained from the mobile vehicle 11. The Mapview software in a preferred implementation is written using Microsoft Visual Basic™ and also utilizing Mapinfo™ software. The Mapinfo™ software may be used as a geographical object in Mapview 54 displaying a preconstructed workspace consisting of a sector and street map. In a preferred implementation the Mapview software 54 is loaded on the base PC 22. However, in the alternative embodiment discussed with respect to FIG. 3 the Mapview software 54 may be loaded on PC/GPS 14 and the post-processing performed at the mobile vehicle 11.

Figure 7:
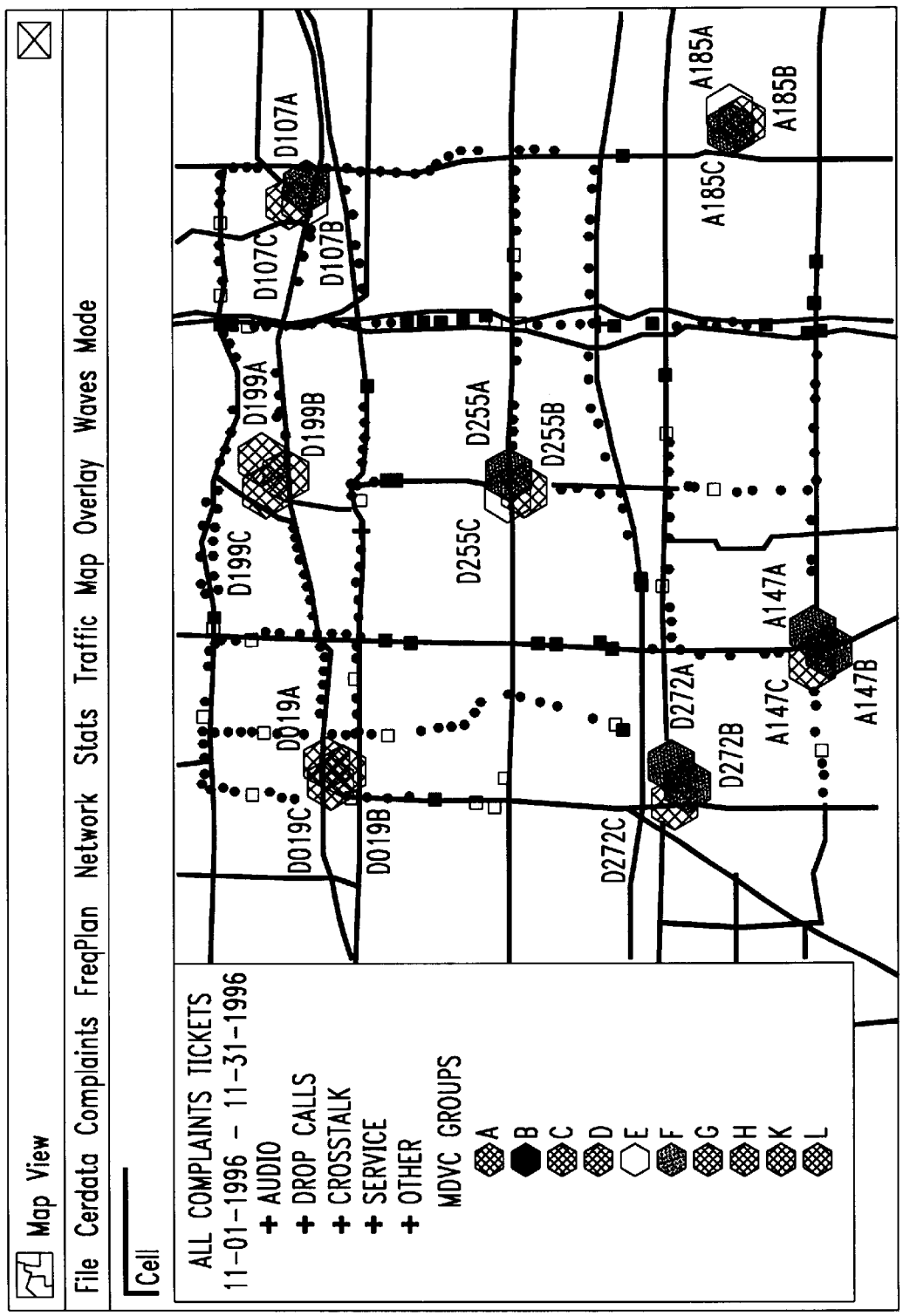
FIG. 7 illustrates a Mapview display on the base PC.

A typical PC screen display of Mapview 54 is shown in FIG. 7. The Mapview program 54 is used to simultaneously view graphically on the base PC 22 the information contained within the master database 46 as well as the drive test data collected using Visual CER 50 and Visual GPS 52, and customer complaints from a trouble tracker system used by a customer care department. By placing the drive test data within an accurate network environment, Mapview 54 allows the system evaluator to quickly identify the problem areas and diagnose the cause. By overlaying the customer complaints the system evaluator may determine future drive routes that will be driven and document network improvements.

A problem in maintaining a cell network is maintaining the system databases for frequency planning, hand-off parameters, and access parameters. The optimization software 40 uses the master database 46 which is updated from data files pulled from the switch 18. By updating the master database 46 from switch ASCII log files it helps eliminate errors due to human mistakes. The master database 46 has several predefined queries that provide the system evaluator with accurate voice channel counts, accurate frequency information, and a means to evaluate and track system parameter changes. This data is then automatically converted into color coded maps using Mapview 54 with respect to the sites geographic location for easy problem detection which saves time and resources.

Mapview 54 generates at least 10 drive test exception plots. They include SSFVC (signal strength forward voice channel), FBER (forward (or downlink) bit error rate), SSRVC (signal strength reverse voice channel), RBER (reverse (or uplink) bit error rate), PLM (mobile RF power level), Path Delta (which identifies uplink/downlink RSSI differences), BSVR Delta (which indicates when the mobile is not on the best strongest site), HANDOFFS (identifies intercell handoffs, intracell handoffs (interference), and interexchange handoffs (handoffs across switch borders)), DROPS (identifies dropped calls), and MOBILE GROUPS (frequency group that the mobile is on). To make obtaining these plots as easy as possible Mapview 54 has a benchmark option that will generate a complete set of these plots if selected. All of these plots are exception plots which means that only the problems are highlighted. All of the thresholds are preset ensuring that all of the system engineers are using the same values.

With Mapview 54, the system evaluator can display the relative network information dealing with a specific problem that is attempted to be solved. Mapview 54 will display the following information: locations for active and/or proposed cells, customer complaints by type, frequency groups (digital and analog), SAT (supervisory audio tone), and DCC (digital color code) information, paging and location areas (used for call delivery), and voice channel handling selection order. By selecting a particular sector the system evaluator may view detailed information about that sector including the individual channels associated to that sector.

Figure 10A:
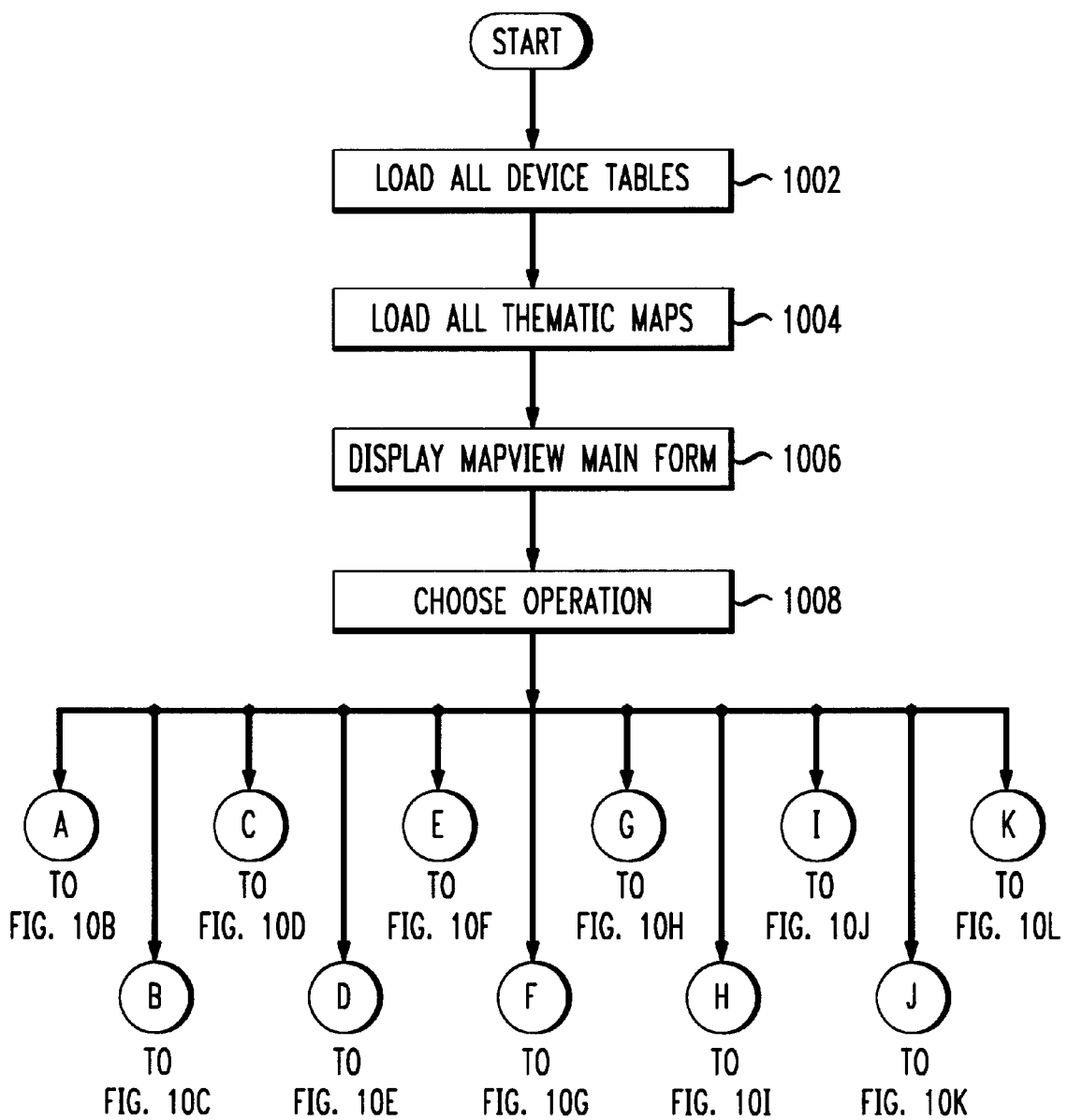

FIG. 10A illustrates a Mapview flowchart describing a preferred implementation. In step 1002, all device tables are loaded in the base PC 22. In step 1004, all thematic maps are loaded. Thematic maps are color coded maps based on temperature schemes (i.e., red being hottest or weak signal, yellow being mild, blue being coldest or good signal) to indicate troubled coverage areas. In step 1006, the Mapview main form is displayed. In step 1008, the next operation is chosen by the system evaluator depending on what area type of analysis he wants to perform.

Figure 10B:
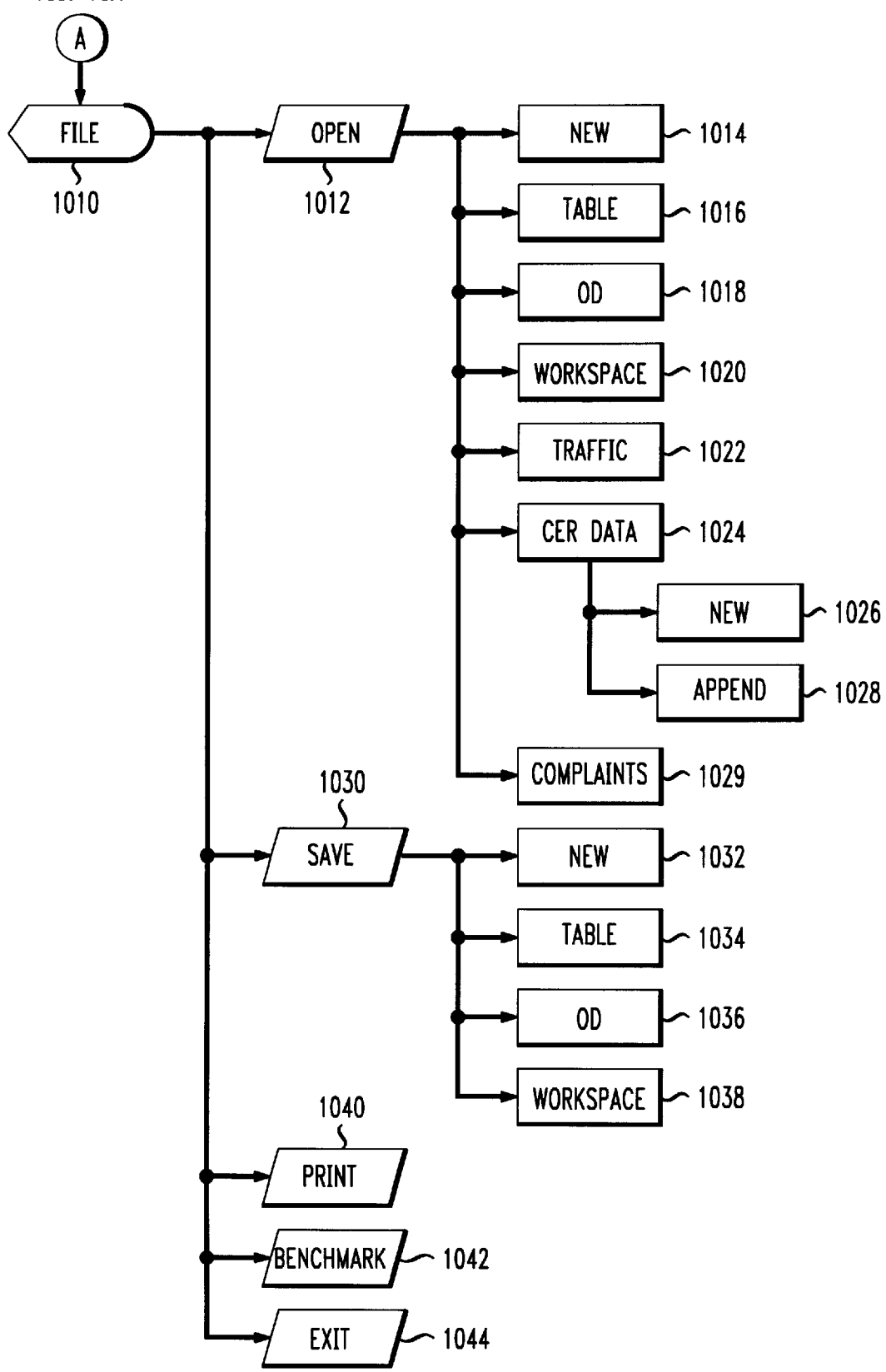

FIG. 10B illustrates path A which allows the operator to work with file commands 1010. The operator may open a file 1012 which includes new files 1014, tables 1016, open databases (OD) 1018, workspace 1020, traffic 1022, CER data 1024, and complaints 1029. CER data 1024 includes new CER data 1026 and appended CER data 1028 (which is a combination of CER data files). The system evaluator may also save 1030 map files under new 1032, table 1034, OD 1036, and workspace 1038. The operator may also print a map 1040, benchmark an entire drive test 1042 (prints all the different types of maps automatically), or exit the program 1044.

Figure 10C:
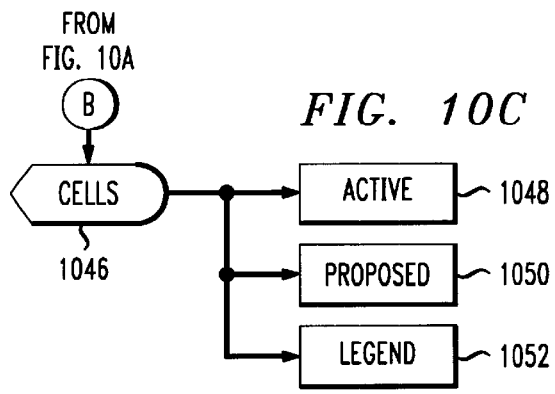

FIG. 10C illustrates path B which allows the operate to create a thematic map of cells 1046. The cells could include active cells 1048 or proposed cells 1050. Legend 1052 is used in Mapview 54 to display symbols and is used here in the same manner as the term "legend" is used in a street map.

Figure 10D:
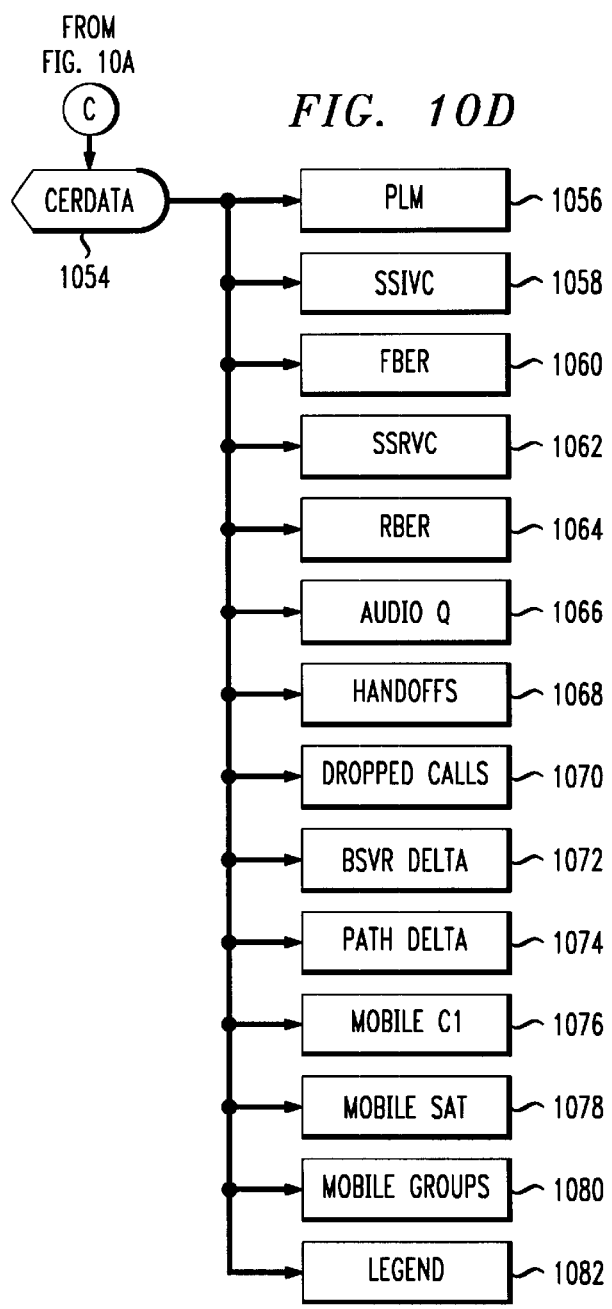

FIG. 10D illustrates path C which creates a thematic map of specific events recorded during a Visual CER drive test 1054. The events as discussed above include PLM 1056 (power level at the mobile unit 12), SSFVC 1058, FBER 1060, SSRVC 1062, RBER 1064, Audio Q 1066 (Audio Quality), Handoffs 1068, Dropped Calls 1070, BSVR Delta 1072, Path Delta 1074 (difference between forward and reverse signal strength). Mobile C/I 1076 (mobile carrier interference ratio), Mobile SAT 1079 (mobile supervisory audio tones), Mobile Groups 1080, and legend 1082.

Figure 10E:
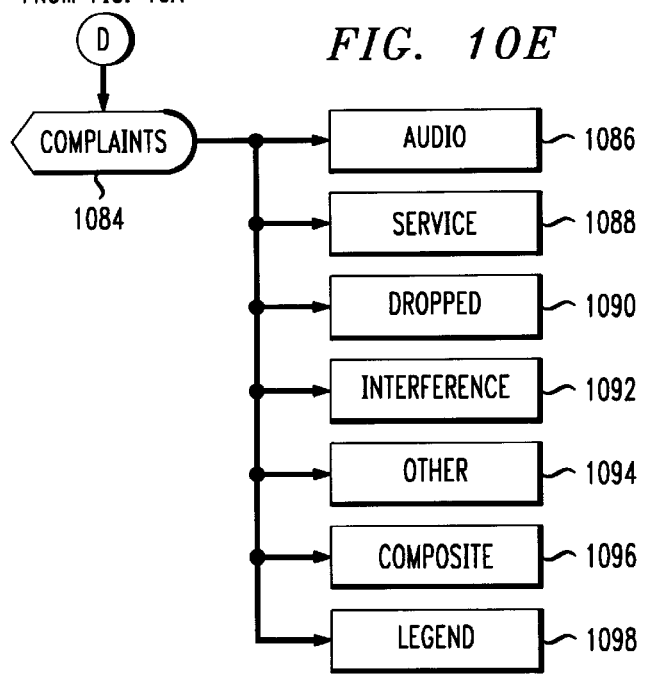

FIG. 10E illustrates path D which creates a thematic map from any trouble tracker or complaint database file 1084. The complaints include audio 1086, service 1088, dropped calls 1090, interference 1092, other types 1094, composite 109E (a collection of different types of complaints), and Legend 1098.

Figure 10F:
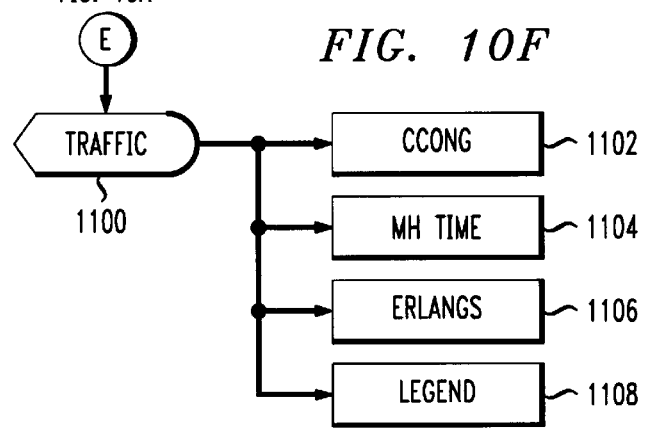

FIG. 10F illustrates path E which creates a thematic map from any traffic file 1100. The traffic file includes Ccong 1102 (congestion), MH Time 1104 (mean holdtime), Erlangs 2106 (measurement of call seconds), and Legend 1108.

Figure 10G:
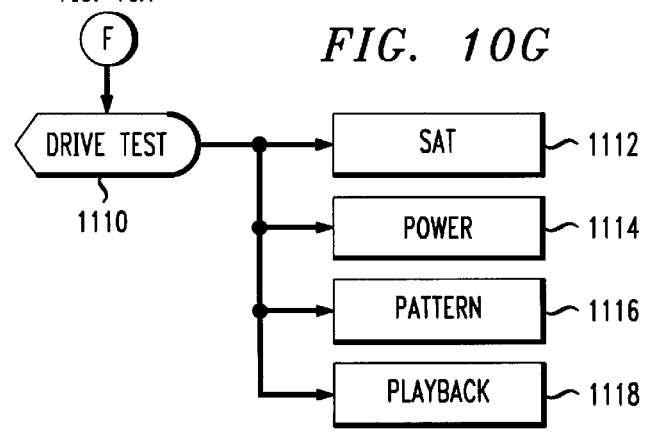

FIG. 10G illustrates path F which creates a thematic map from visual CER collected drive test data 1110. The drive test data include SAT 1112 (supervisory audio tones), RF power settings 1114, or antenna patterns 1116. Playback 1118 of the drive test data is also included.

FIG. 10H illustrates path G which selects the modulation mode 1120 for all views to be displayed. The modes include CDPD 1122, analog 1124, and digital 1126.

FIG. 10I illustrates path H which creates a thematic map representing the frequency groups 1130 and/or color codes 1140 assigned to all of the cell sites. Frequency groups 1130 include for example Sector A 1132, Sector B 1134, Sector C 1136, or all three Sectors 1138 which make up the 360 degrees of direction of a cell site.

Figure 10J:
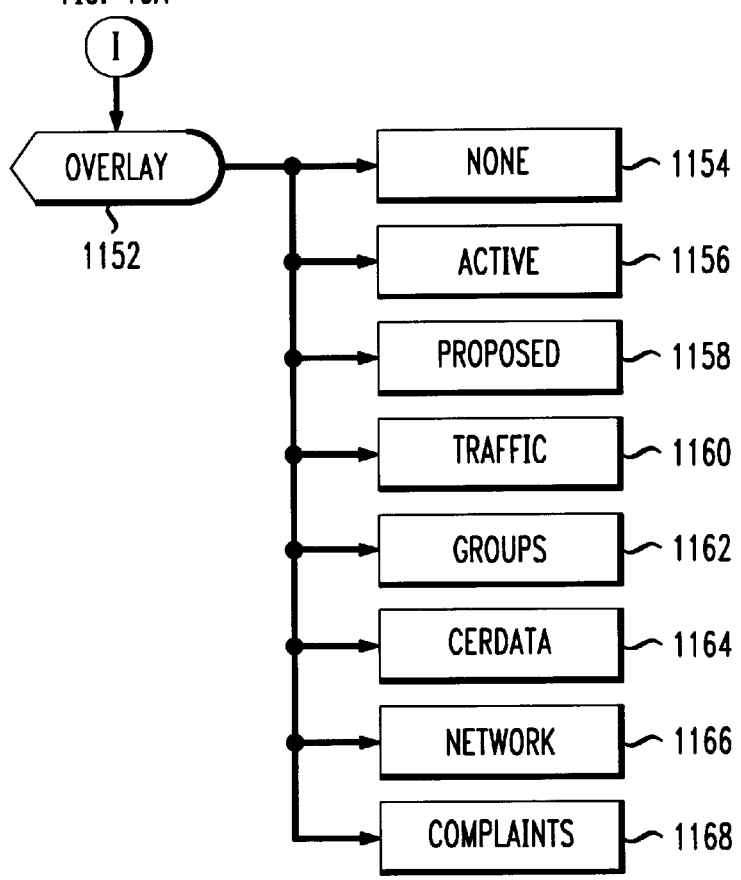

FIG. 10J illustrates path I which allows removal of selected map layers 1152. The settings include None 1154, Active 1156, Proposed 1158, Traffic 1160, Groups 1162, CER data 1164, Network 1166, and complaints 1168.

Figure 10L:
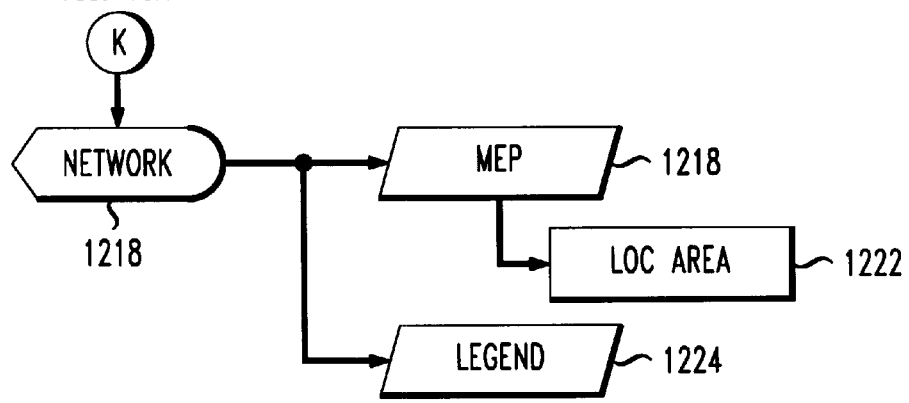
Figure 10K:
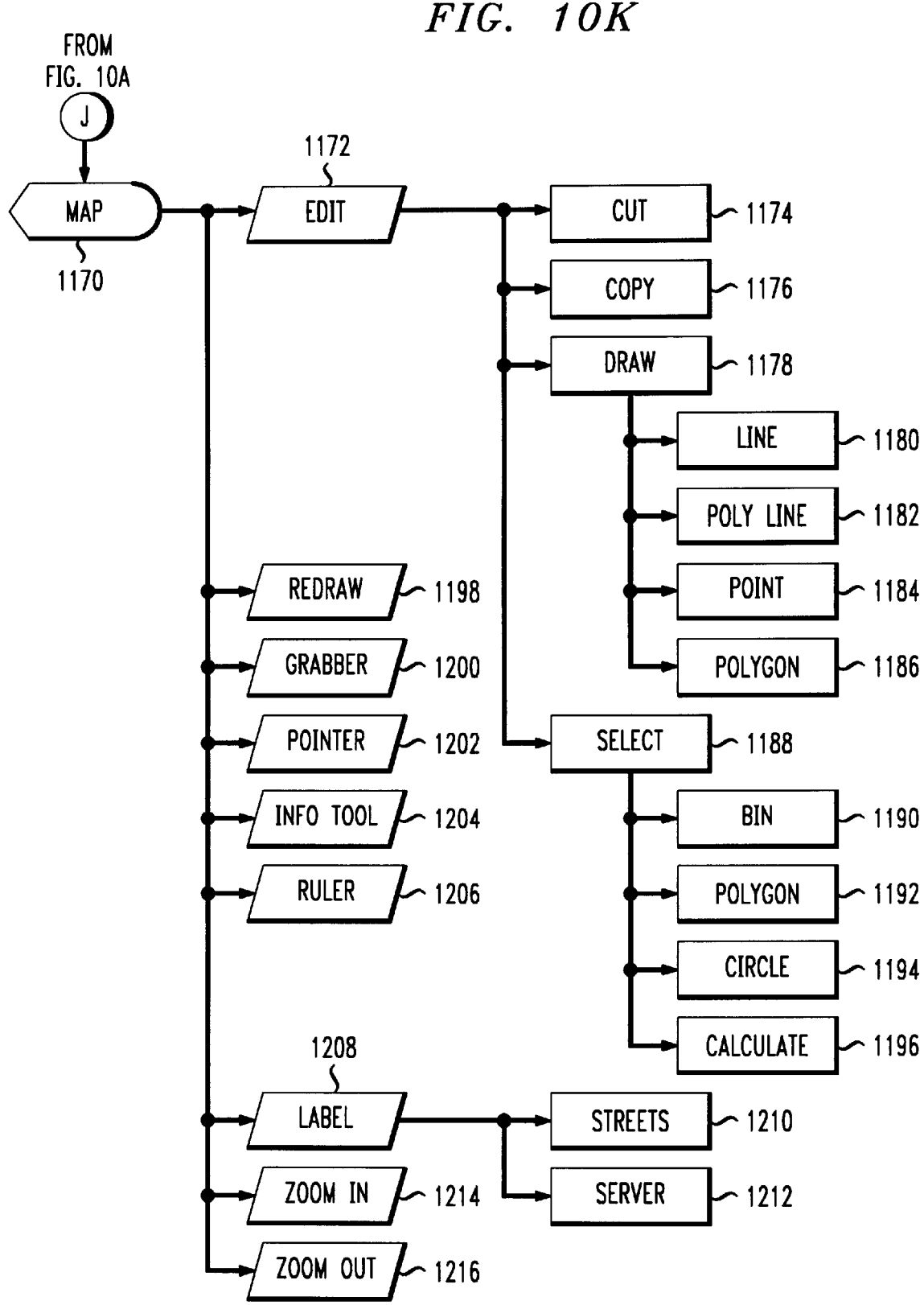

FIG. 10K illustrates path J which assigns curser tools that perform independent tasks 1170 in the map in Mapview 54. The tools include Edit 1172, Redraw 1198, Grabber 1200 (which allows the system evaluator to grab the map and move it to a new location), Pointer 1202, Information Tool 1204, Ruler 1206 (allows measurements between points in cell sites), Label 1208, Zoom in 1214, and Zoom Out 1216. The Edit tool 1172 allows for cutting 1174, copying 1176, drawing 1178, and select 1188. Drawing 1178 includes lines 1180, polygonal lines 1182, points 1184, and polygons 1186. Select 1188 includes a bin 1190, a polygon 1192, a circle 1194, and a calculate function 1196. The Label tool 1208 includes streets 1210 and servers 1212.

FIG. 10L creates a thematic map representing the network paging location area assignments 1218. Assignments include MEP 1220 which includes local areas 1222 and Legend 1224. This allows for a more efficient paging method by limiting the number of cell sites that have to be paged.

Based on the mobile communications system analysis, adjustment way be made to one or all of the system parameters to obtain optimum performance. For example, adjustments include changing the down tilt of the RBS antenna 17 (to take energy off horizon so as to concentrate it) or increasing or decreasing the power of a cell site. System evaluators have agreed on certain goals that must be achieved by the system parameters such as a specific set of RSSI level break points, BER thresholds forward and reverse, etc., that are a requirement for a cell site. The mobile communications system analysis of the preferred embodiment may be used to expedite service improvements and to determine future build plans.

The above-described embodiment is illustrative of the principles of the present invention. Various modifications and changes may be devised by those skilled in the art without departing from the spirit and scope of the invention as set forth in the appended claims.

What is claimed is:

1. A method comprising:

receiving at a cell site a wireless signal from a mobile wireless system;

determining at least one of signal strength and signal error of the wireless signal;

communicating the at least one of signal strength and signal error to the mobile wireless system;

the mobile wireless system correlating the at least one of signal strength and signal error with location information collected by the mobile wireless system;

communicating the at least one of signal strength and signal error through a data switch before communicating the at least one of signal strength and signal error to the mobile wireless system, wherein the data switch is part of a cellular digital packet data (CDPD) network; and communicating the at least one of signal strength and signal error through a voice switch before communicating the at least one of signal strength and signal error to the mobile wireless system.

2. A method comprising:

receiving at a cell site a wireless signal comprising location data from a mobile wireless system, the location data received via a voice channel;

determining at least one of a signal strength and signal error for the wireless signal;

communicating the at least one of a signal strength and signal error to a processing device via a voice switch;

communicating the location data to the processing device via a data switch; and the processing device causing the at least one of a signal strength and signal error to be visually correlated with the location data.

3. The method of claim 2, further comprising:

communicating the at least one of a signal strength and signal error to the processing device in a first base station;

communicating the location data to a second base station; and the second base station communicating the location data to the first base station.

4. The method of claim 3, further comprising:

the second base station communicating with the first base station via a CDPD modem.

5. The method of claim 2 wherein the location data is received via CDPD.

* * * * *

UNITED STATES PATENT AND TRADEMARK OFFICE
CERTIFICATE OF CORRECTION

PATENT NO.       : 6,603,966 B1                                    Page 1 of 1
APPLICATION NO. : 08/996486
DATED            : August 5, 2003
INVENTOR(S)      : John P. Sheffield It is certified that error appears in the above-identified patent and that said Letters Patent is hereby corrected as shown below:

<u>Column 2</u>
Line 39,        "In" should read --in--.
Line 40,        "in" should read --is--.
Line 46,        "visual" should read --Visual--.
Line 61,        "office" should read --Office--, <u>Column 3</u>
Line 18,        "/GPs)" should read --/GPS)--.
Line 22,        "codification" should read --communication--.
Line 45,        "193" should read --19B--,
Line 66,        "error:" should read --error;--

<u>Column 6</u>
Line 17,        "Using" should read --using--.
Line 41,        "waster" should read --master--.

<u>Column 7</u>
Line 19,        "It" should read --If--.
Line 32,        "confiscation" should read --communication--.
Line 58,        "time," should read --time.--.

<u>Column 9</u>
Line 44,        "1084," should read --1084.--.
Line 48,        "l09E" should read --1096--.

Signed and Sealed this

Twenty-sixth Day of December, 2006

JON W. DUDAS
*Director of the United States Patent and Trademark Office*